US012270638B2

(12) United States Patent
Wei et al.

(10) Patent No.: US 12,270,638 B2
(45) Date of Patent: Apr. 8, 2025

(54) MEASUREMENT SYSTEM AND MEASUREMENT METHOD

(71) Applicant: Industrial Technology Research Institute, Hsinchu (TW)

(72) Inventors: Hsiang-Chun Wei, Hsinchu (TW); Chun-Wei Lo, Taichung (TW); Chung-Lun Kuo, New Taipei (TW); Chih-Hsiang Liu, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 227 days.

(21) Appl. No.: 18/089,547

(22) Filed: Dec. 27, 2022

(65) Prior Publication Data

US 2024/0200935 A1 Jun. 20, 2024

(30) Foreign Application Priority Data

Dec. 14, 2022 (TW) ................... 111147905

(51) Int. Cl.
*G01B 11/25* (2006.01)
*G01B 11/24* (2006.01)

(52) U.S. Cl.
CPC ........ *G01B 11/254* (2013.01); *G01B 11/2441* (2013.01)

(58) Field of Classification Search
CPC .......... G01B 11/254; G01B 11/2441
See application file for complete search history.

(56) References Cited

U.S. PATENT DOCUMENTS

| 4,969,043 | A  | * | 11/1990 | Pothier ............... G06E 3/005 348/835 |
| 9,618,369 | B2 |   | 4/2017  | Weaver et al. |
| 2017/0153106 | A1 | * | 6/2017 | Ozcan .................. G03H 1/02 |
| 2019/0313524 | A1 | * | 10/2019 | Huang ................. H01L 23/481 |
| 2020/0285194 | A1 | * | 9/2020 | Yurt .................... G03H 1/0465 |
| 2022/0214161 | A1 |   | 7/2022 | Corvers et al. |

FOREIGN PATENT DOCUMENTS

| CN | 111006608 | 4/2020 |
| CN | 111149066 | 5/2020 |
| TW | 201124716 | 7/2011 |
| TW | 202045452 | 12/2020 |
| WO | 2012094523 | 7/2012 |

OTHER PUBLICATIONS

"Office Action of Taiwan Counterpart Application", issued on Oct. 4, 2023, p. 1-p. 4.
Yibo Zhang et al., "3D imaging of optically cleared tissue using a simplified CLARITY method and on-chip microscopy", Science Advances, vol. 3, Issue 8, Aug. 11, 2017, pp. 1-12.

* cited by examiner

*Primary Examiner* — Hina F Ayub
*Assistant Examiner* — Akbar H. Rizvi
(74) *Attorney, Agent, or Firm* — JCIPRNET

(57) ABSTRACT

A measurement system including an excitation light source, an image sensor, and a calculator is provided. The excitation light source is configured to emit an excitation light beam. The image sensor is configured to record an image of the excitation light beam passing through a glass substrate having a plurality of vias. The image is a 2D interference pattern. The calculator is electrically connected to the image sensor. The calculator analyzes a 3D geometric-structure image of the vias in the glass substrate according to the image. A measurement method is also provided.

12 Claims, 2 Drawing Sheets

MEASUREMENT SYSTEM AND MEASUREMENT METHOD

CROSS-REFERENCE TO RELATED APPLICATION

This application claims the priority benefit of Taiwan application serial no. 111147905, filed on Dec. 14, 2022. The entirety of the above-mentioned patent application is hereby incorporated by reference herein and made a part of this specification.

TECHNICAL FIELD

The disclosure relates to an optical system and an optical method, and more particularly, to a measurement system and a measurement method.

BACKGROUND

Through glass via (TGV) is utilized in chip packaging, which has the advantages of low warpage, faster signal transmission, and better power efficiency. When applied to IC substrates, the critical dimensions of the process continue to shrink (e.g., opening<5 μm, via angle≤8°). Moreover, the via angle directly affects the difficulty of copper filling process. Thus, a non-contact and non-destructive angle detection method is required.

However, the detection technologies for glass vias on the market, such as laser conjugate focus technology, color conjugate focus technology, and white light scanning technology, can only measure single holes and are accompanied by disadvantages such as being time-consuming and inability to measure the side wall angle. Moreover, to measure the side wall angle of the glass via, the sample needs to be destroyed if using the above measurement method. However, even if the sample is destroyed, only the side wall angles of the vias on the sliced plane of the destroyed sample are able to be measured, which still has the disadvantage of not being able to measure the side wall angles of all vias.

SUMMARY

The disclosure provides a measurement system and a measurement method that measure a glass substrate in non-contact and non-destructive manners.

An embodiment of the disclosure provides a measurement system, which includes an excitation light source, an image sensor and, a calculator. The excitation light source is configured to emit an excitation light beam. The image sensor is configured to record an image of the excitation light beam passing through a glass substrate having multiples vias. The image is a 2D interference pattern. The calculator is electrically connected to the image sensor. The calculator analyzes a 3D geometric-structure image of the vias in the glass substrate according to the image.

An embodiment of the disclosure provides a measurement method, which is described below. An excitation light source is configured to emit an excitation light beam. An image of the excitation light beam passing through a glass substrate having multiples vias is recorded. A 3D geometric-structure image of the vias in the glass substrate is analyzed according to the image. The image is a 2D interference pattern.

Based on the above, in an embodiment of the disclosure, the measurement system and the measurement method analyze the 3D geometric-structure image of the via in the glass substrate according to the image of the excitation light beam passing through the glass substrate having multiple vias. Thus, the measurement system and the measurement method simultaneously obtain the size, depth, and side wall angle of the vias in non-contact and non-destructive manners.

DETAILED DESCRIPTION OF DISCLOSURED EMBODIMENTS

Figure 1:
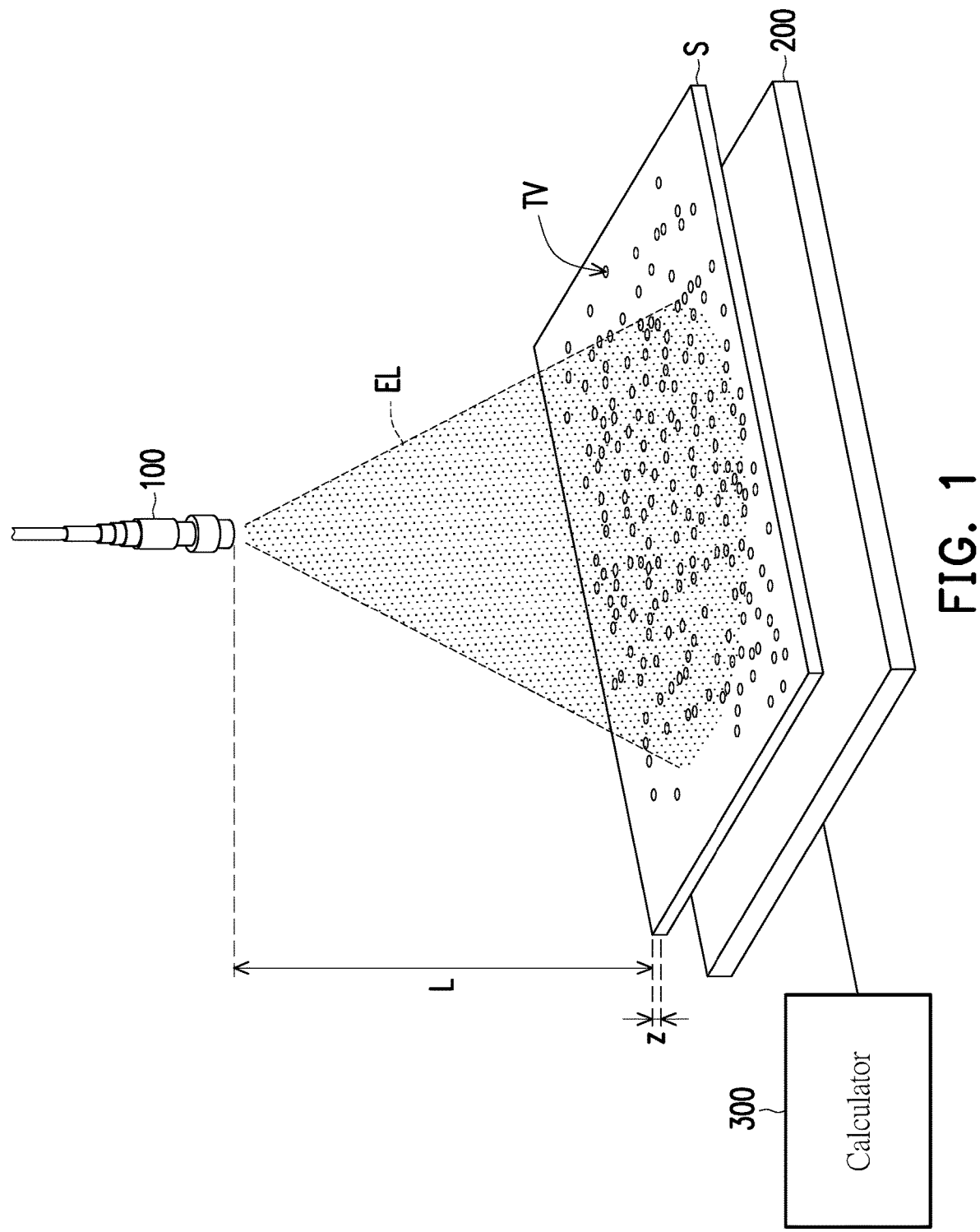
FIG. 1 is a schematic view of a measurement system according to an embodiment of the disclosure.
Figure 2:
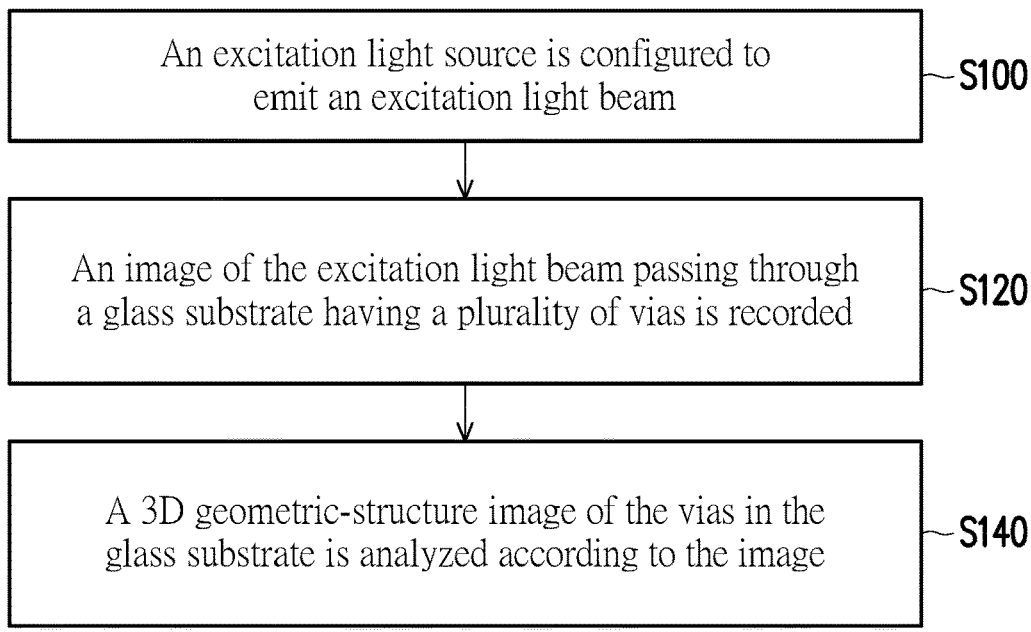
FIG. 2 is a flowchart of a measurement method according to an embodiment of the disclosure.

FIG. 1 is a schematic view of a measurement system according to an embodiment of the disclosure. FIG. 2 is a flowchart of a measurement method according to an embodiment of the disclosure. Referring to FIG. 1 and FIG. 2, an embodiment of the disclosure provides a measurement system 10 and a measurement method. The measurement system 10 includes an excitation light source 100, an image sensor 200 and a calculator 300. The excitation light source 100 is configured to emit an excitation light beam EL. The image sensor 200 is configured to record an image of the excitation light beam EL passing through a glass substrate S having multiple vias TV. The image is a 2D interference pattern. The calculator 300 is electrically connected to the image sensor 200. The calculator 300 analyzes a 3D geometric-structure image of the vias TV in the glass substrate S according to the image.

In this embodiment, the measurement method is described below. Step S100: an excitation light source 100 is configured to emit an excitation light beam EL. Step S120: an image of the excitation light beam EL passing through a glass substrate S having multiple vias TV is recorded. The image is a 2D interference pattern. Step S140: a 3D geometric-structure image of the vias TV in the glass substrate S is analyzed according to the image.

In this embodiment, the excitation light source 100 is a light source that emits lights with coherence, such as a laser light source or a light-emitting diode (LED) light source.

In this embodiment, the image sensor 200 is a complementary metal-oxide semiconductor (CMOS) photosensor or a charge coupled device (CCD) photosensor, but the disclosure is not limited thereto.

In this embodiment, the calculator 300 is, for example, a central processing unit (CPU), a microprocessor, a digital signal processor (DSP), a programmable processing device, a programmable logic device (PLD) or other similar devices or a combination thereof, which is not limited in the disclosure. In addition, in an embodiment, each of the functions of the calculator 300 is implemented as multiple codes. The codes are stored in a memory, and the calculator 300 executes the codes. Alternatively, in an embodiment, each of the functions of the calculator 300 is implemented as one or more circuits. The disclosure does not limit the implementation of the functions of the calculator 300 by means of software or hardware.

Since the opening size of the via TV falls within a few micrometers (μm), the measurement system 10 and measurement method of the disclosure embodiment are similar to pinhole imaging. In response to the excitation light beam EL passing through the glass substrate S, a part of the excitation light beam EL is affected by the via TV to form a disturbed light, and the other part of the excitation light beam EL is not affected and forms an undisturbed light. Since the undisturbed light still retains coherence, the disturbed light and the undisturbed light still form an interference pattern (i.e., 2D interference pattern) on the sensing surface of the image sensor 200.

In short, in response to $U_{det}$ (X,Y) is the image and $U_{obj}$ (z) is the (2D structure) image of glass substrate S on any one of cutting planes, then the following relationship of formula (1) is present between the $U_{det}$ (X,Y) and the $U_{obj}$ (z):

$$U_{obj}(z) = F^{-1}\left\{F\{U_{det}\}\exp\left(iz\sqrt{k^2 - \frac{4?^2 n^2}{Np}}\right)\right\} \quad (1)$$

F is the Fourier transform, $F^{-1}$ is the inverse Fourier transform, k is the wave vector, n is the refractive index, N is the pixel amount, and p is the pixel size.

Figure 3:
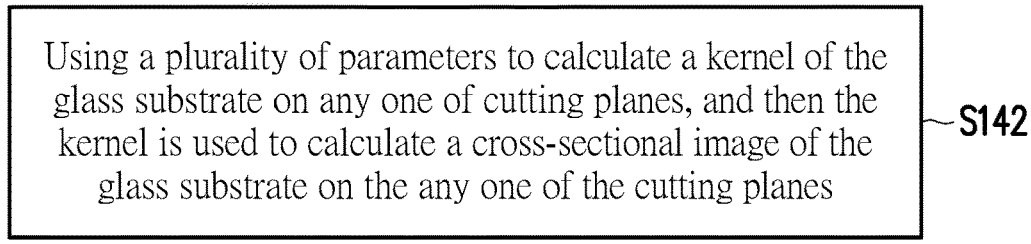
FIG. 3 is a partial flowchart of a measurement method according to an embodiment of the disclosure.
Figure 4:
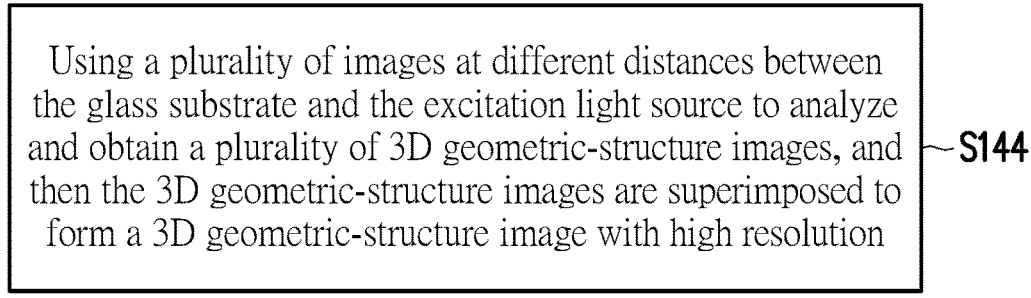
FIG. 4 is a partial flowchart of a measurement method according to an embodiment of the disclosure.

FIG. 3 is a partial flowchart of a measurement method according to an embodiment of the disclosure. Referring to FIG. 3, specifically, step S140 of this embodiment includes step S142: (the calculator 300) uses multiple parameters to calculate a kernel (corresponding to the exponential function in formula (1)) of the glass substrate S on any one of cutting planes, and then the kernel is used to calculate a cross-sectional image of the glass substrate S on the any one of the cutting planes. The parameters include the resolution (M, N) of the 2D interference pattern, the pixel size (dx, dy) of the 2D interference pattern, the wavelength λ of the excitation light beam EL, the distance L from the excitation light source 100 to the glass substrate S, and the resolution (dxOut, dyOut) of the any one of the cutting planes on the depth z of the glass substrate S and on the object (i.e., glass substrate S) plane. The depth z is defined as the distance between the any one of the cutting planes and the surface of the glass substrate S facing the excitation light source 100, dxOut is defined as dx*z/L. and dyOut is defined as dy*z/L. That is, similar to tomography, different cross-sectional images are combined to form a 3D geometric-structure image of glass substrate S.

In this embodiment, the closer the glass substrate S is to the excitation light source 100, the greater a magnifying ratio of the 3D geometric-structure image, but the lower a resolution of the 3D geometric-structure image. That is, in response to the glass substrate S being close to the excitation light source 100, a 3D geometric-structure image with a larger magnifying ratio is obtained, but the resolution thereof is lower. Conversely, in response to the glass substrate S staying away from the excitation light source 100, a 3D geometric-structure image with a higher resolution is obtained, but the magnifying ratio thereof is smaller.

In this embodiment, step S140 further includes step S144: (the calculator 300) uses multiple images at different distances L between the glass substrate S and the excitation light source 100 to analyze and obtain multiple 3D geometric-structure images, and then the 3D geometric-structure images are superimposed to form a 3D geometric-structure image with high resolution. Taking FIG. 1 as an example, the image is obtained at distance L, and the 3D geometric-structure image corresponding to the image is analyzed. Afterwards, the glass substrate S is brought close to or far away from the excitation light source 100 by a few micrometers, and images at different distances L are obtained sequentially, and the 3D geometric-structure images corresponding to the images are analyzed. Next, the aforementioned 3D geometric-structure images are superimposed as an image to form a 3D geometric-structure image with high resolution.

In this embodiment, in a light pathway of the excitation light beam EL, no lens with refractive power is provided between the excitation light source 100 and the image sensor 200.

To sum up, in an embodiment of the disclosure, the measurement system and the measurement method use the image sensor to record the image of the excitation light beam passing through the glass substrate having multiple vias, and then use the calculator to analyze the 3D geometric-structure image of the via in the glass substrate based on the image. Therefore, the measurement system and the measurement method simultaneously obtain the size, depth, and side wall angle of multiple vias in non-contact and non-destructive manners. Moreover, since the measurement system and the measurement method do not destroy the glass substrate, compared with conventional measurement methods, the measurement system and the measurement method of the disclosure embodiment further avoid the waste of samples.

What is claimed is:

1. A measurement system, comprising:
   an excitation light source, configured to emit an excitation light beam;
   an image sensor, configured to record an image of the excitation light beam passing through a glass substrate having a plurality of vias, wherein the image is a 2D interference pattern; and
   a calculator, electrically connected to the image sensor, wherein the calculator analyzes a 3D geometric-structure image of the vias in the glass substrate according to the image,
   wherein the calculator uses a plurality of parameters to calculate a kernel of the glass substrate on any one of cutting planes, and then the kernel is used to calculate a cross-sectional image of the glass substrate on the any one of the cutting planes.

2. The measurement system according to claim 1, wherein in a light pathway of the excitation light beam, no lens with refractive power is provided between the excitation light source and the image sensor.

3. The measurement system according to claim 1, wherein the parameters comprise a resolution of the 2D interference pattern, a pixel size of the 2D interference pattern, a wavelength of the excitation light beam, a distance from the excitation light source to the glass substrate, and a depth of the any one of the cutting planes in the glass substrate.

4. The measurement system according to claim 1, wherein the closer the glass substrate is to the excitation light source, the greater a magnifying ratio of the 3D geometric-structure image.

5. The measurement system according to claim 1, wherein the closer the glass substrate is to the excitation light source, the lower a resolution of the 3D geometric-structure image.

6. The measurement system according to claim 1, wherein the calculator uses a plurality of images at different distances between the glass substrate and the excitation light source to analyze and obtain a plurality of 3D geometric-structure images, and then the 3D geometric-structure images are superimposed to form a 3D geometric-structure image with high resolution.

7. A measurement method, comprising:
   configuring an excitation light source to emit an excitation light beam;

recording an image of the excitation light beam passing through a glass substrate having a plurality of vias; and analyzing a 3D geometric-structure image of the vias in the glass substrate according to the image, wherein the image is a 2D interference pattern, wherein analyzing the 3D geometric-structure image of the vias in the glass substrate according to the image comprises:

using a plurality of parameters to calculate a kernel of the glass substrate on any one of cutting planes, and then using the kernel to calculate a cross-sectional image of the glass substrate on the any one of the cutting planes.

8. The measurement method according to claim 7, wherein in a light pathway of the excitation light beam, no lens with refractive power is provided between the excitation light source and an image sensor.

9. The measurement method according to claim 7, wherein the parameters comprise a resolution of the 2D interference pattern, a pixel size of the 2D interference pattern, a wavelength of the excitation light beam, a distance from the excitation light source to the glass substrate, and a depth of the any one of the cutting planes in the glass substrate.

10. The measurement method according to claim 7, wherein the closer the glass substrate is to the excitation light source, the greater a magnifying ratio of the 3D geometric-structure image.

11. The measurement method according to claim 7, wherein the closer the glass substrate is to the excitation light source, the lower a resolution of the 3D geometric-structure image.

12. The measurement method according to claim 7, wherein analyzing the 3D geometric-structure image of the vias in the glass substrate according to the image further comprises:

using a plurality of images at different distances between the glass substrate and the excitation light source to analyze and obtain a plurality of 3D geometric-structure images, and then superimposing the 3D geometric-structure images to form a 3D geometric-structure image with high resolution.

\* \* \* \* \*